Jan. 15, 1957 U. H. KRABBE ET AL 2,777,978
APPARATUS FOR REGULATING THE NUMBER OF REVOLUTIONS OF
ELECTRIC MOTORS BY MEANS OF WARD-LEONARD CONTROL
Filed Nov. 25, 1952 2 Sheets-Sheet 1
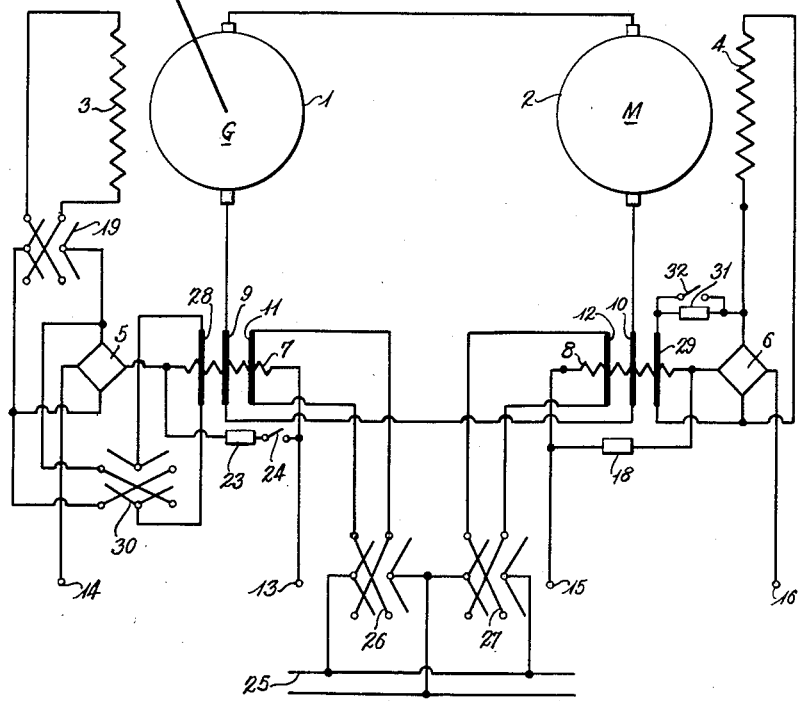
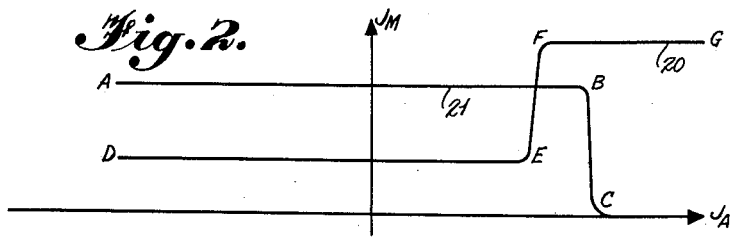
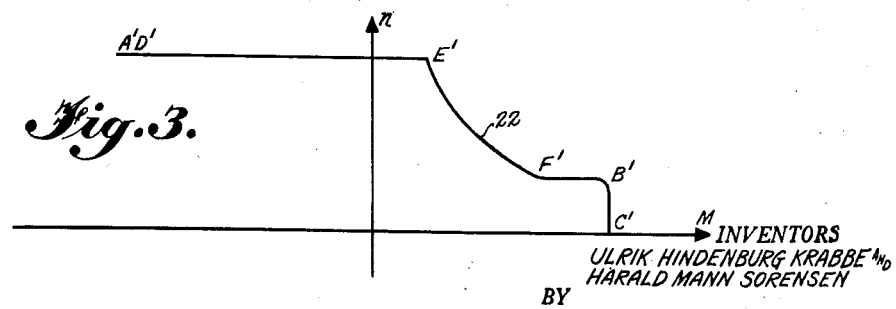
INVENTORS
ULRIK HINDENBURG KRABBE AND
HARALD MANN SORENSEN
BY
Stevens, Davis, Miller & Mosher
ATTORNEYS

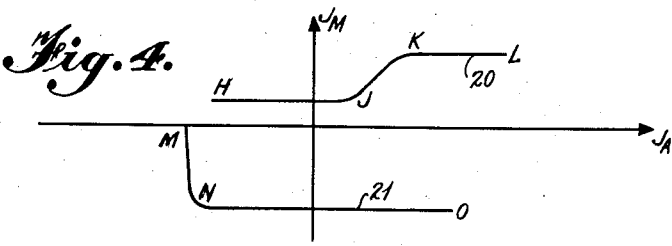
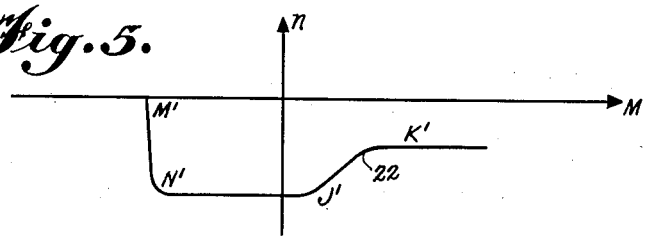
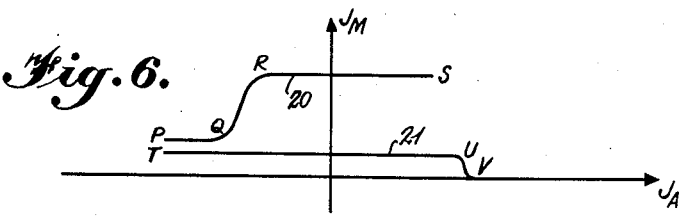
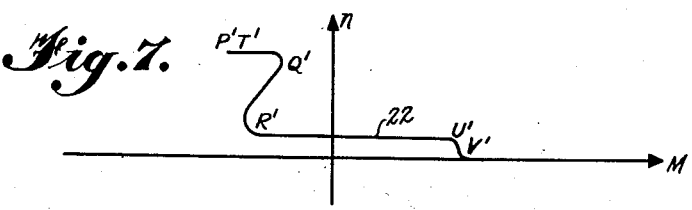
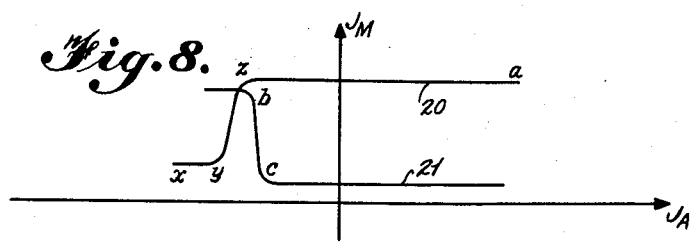
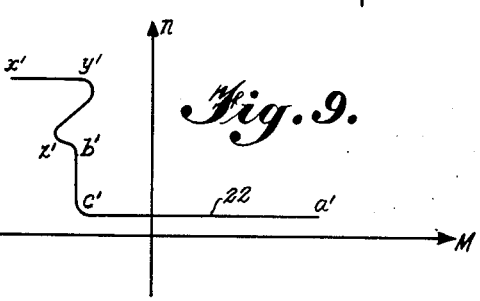

United States Patent Office 2,777,978
Patented Jan. 15, 1957

2,777,978

APPARATUS FOR REGULATING THE NUMBER OF REVOLUTIONS OF ELECTRIC MOTORS BY MEANS OF WARD-LEONARD CONTROL

Ulrik Hindenburg Krabbe and Harald Mann Sørensen, Fruens Boge, Denmark, assignors to Thomas B. Thridge, Odense, Denmark, a firm Application November 25, 1952, Serial No. 322,424

Claims priority, application Denmark December 14, 1951

7 Claims. (Cl. 318—154)

This invention relates to a method and apparatus for regulating the number of revolutions of electric motors and more particularly to such motors including the so-called Ward-Leonard control.

In hoists (cranes, winches, lifts and the like) the motor for the lifting movement—and in vehicles, e. g. diesel-electric locomotives and ships, the motor for the driving movement—is usually connected with a generator by means of a so-called Ward-Leonard circuit-arrangement. In this arrangement the generator runs at highest speed, and the speed of the motor is regulated by controlling the field of the generator. The field of the motor is kept constant, it being usually only weakened when it is desired to obtain still higher values of the number of revolutions than that obtained at the highest obtainable generator voltage at full generator field.

In many cases it is desirable to obtain a greater increase in the number of revolutions during unloading than entailed by the shunt characteristic of the motor, without intervention from outside. This is obtained by providing the generator with differential compounding.

A decrease in the load will then cause a reduction of the current and thus an increase in the field of the generator. On the other hand, a field weakening of the generator will occur when the load is heavy, and thereby a reduction of the power of the motor, i. e. a decrease in the number of revolutions as well as a limitation of the armature current will result. A similar effect may also be obtained by means of differential compounding of the motor field. The differential compounding of the generator entails, however, that the generator cannot be utilized to its full extent when having to yield its highest power. These facts should be considered when designing the generator, i. e. it should be made bigger than would be necessary without differential compounding.

Another drawback is that an alteration of the direction of revolution requires a change-over of the field compound windings, and, as the current in these windings is relatively large, this means expensive contactors. Further, these arrangements require a great number of control steps in order to avoid too great rushes of current during the acceleration.

It is therefore an object of this invention to provide control apparatus and method requiring no use of change-overs in the armature circuit. To this end saturable reactors or, as hereinafter referred to, transductors (D. C. magnetized choke coils) are used according to the invention in connection with rectifiers in a special circuit. It is known to use transductors in the field circuit of motors in series with rectifiers, the transductors being controlled by the armature current, so that the motor field rises or grows strongly if the armature current exceeds a certain value. This control principle has been used in rolling mill motors in connection with a large fly-wheel the increase in the motor field causing a decrease of the number of revolutions so that the motor consumes energy from the fly-wheel, whereby it is avoided to cover the peaks of the load from the mains.

It is also known to connect the motor and generator fields in a circuit-arrangement through rectifiers to A. C. mains in order to introduce a stabilizing component in the field circuits which are otherwise magnetized in series.

In contradistinction to these known circuit-arrangements the invention relates to an apparatus for regulating the number of revolutions of motors by means of Ward-Leonard control, in particular for vehicles and hoists, the motor field as well as the generator field being connected through rectifiers to an A. C. source. According to the invention transductors are inserted in both field circuits, which transductors are controlled in dependence of the armature current. The best effect is obtained by self-saturated transductors. By connecting the control winding of the transductors in different ways, different control steps may be obtained having particularly favorable regulation curves.

The invention is explained in greater detail in the following with reference to the figures of the drawings, in which:

Figure 1 shows a circuit-arrangement of a hoist, where the motor and the Ward-Leonard-generator are controlled by transductors according to the invention;

Figures 2, 4, 6 and 8 show the current ($J_M$) in the fields of the motor and the generator in dependence of the armature current ($J_A$) at different arrangements of the D. C. magnetizations of the transductors; and Figures 3, 5, 7 and 9 show number ($n$) of revolutions to torque ($M$) curves at the arrangements applying to the corresponding Figures 2–8, so that 2 and 3, 4 and 5, 6 and 7, 8 and 9 apply to the same state of the circuit-arrangement.

In Figure 1, 1 represents the armature, 3 the field winding of a Ward-Leonard-generator which is mechanically connected to a motor 17. The armature 1 is connected to an armature 2 of a motor having a field winding 4. The field winding 3 is through a rectifier circuit 5 and the main winding 7 of a transductor connected to an A. C. source 13—14. In the field circuit is also inserted a switch 19 which permits the reversing of the magnetizing current of the generator.

In a similar manner the field winding 4 is through a rectifier circuit 6 and the main winding 8 of a transductor connected to an A. C. source 15—16. Both A. C. sources may be derived from the mains, but the value of the voltages need not be the same. Further, the transductors are provided with the control windings 11 and 12, respectively, which, through the reversing switches 26, 27, are magnetized by a separate D. C. source 25, and with the control windings 9, 10 which are in series with the armature field of the generator and the motor. Further, self-magnetizing windings 28, 29 are provided, which are connected to the rectifier circuits 5, 6, the connection of the winding 28 being established through a reversing switch 30, and the connection of the winding 29, through a resistance 31 having a parallel-connected contact 32 permitting an alteration of the degree of self-magnetization. The self-magnetization may, of course, be provided and altered in various ways known per se. Parallel to the transductor winding 8 an impedance 18 is connected, so that a certain current is always maintained in the magnetizing winding 4, which means that the field of the motor cannot be regulated down below a certain value. Likewise, an impedance 23 lies in parallel with the main winding 7 and in series with the contact 24.

With reference to the Figures 2–9 it will be explained in the following which different characteristics are obtainable by changing the direction of magnetization in the windings 28 and 11, 29 and 12, respectively, of the transductors.

If the motor is to yield maximum output the contact 32 is closed and the control windings are connected in the following way. In the transductor controlling the current in the field winding 3 of the generator the self-magnetization in the winding 28 as well as the magnetization in the control winding 11 should have opposite direction of the magnetization which the armature current is producing in the control winding 9 during lifting or forward driving, whereas in the transductor controlling the current in the motor field winding 4, the self-magnetization in the winding 29 as well as the magnetization produced by the armature current in the control winding 10 during lifting or forward driving should have opposite direction of the magnetization in the control winding 12. Thus the curves shown in Figures 2 and 3 are arrived at.

At a certain direction of the current the field current curve 20 of the motor and the field current curve 21 of the generator will now depend on the armature current $I_A$ as shown in Figure 2. As long as the armature current is less than the value corresponding to the point E, the transductor 8, 10, 12, 29 can take up its maximum voltage which is so great that the current through the motor field winding 4 is solely determined by the impedance 18. Therefore, the curve 20 extends along DE parallel to the axis of abscissa. When, on the other hand, the armature current exceeds the value E, the voltage taken up by the transductor decreases, and the current in the field winding 4 is increased from E to F. FG designates the condition in which the transductor practically takes up no voltage.

AB on the curve 21 designates the condition in which the transductor 7, 9, 11, 28 of the generator practically takes up no voltage. Not until the armature current exceeds a value corresponding to the point B will the transductor take up a voltage, so that the current in the field winding 3 goes down and becomes 0 at C, as the contact 24 is open.

This variation in the field currents results in a number of revolutions to torque characteristic as represented by the curve 22, Figure 3. As long as the curves 20 and 21 extend parallel to the axis of abscissa, i. e. until the point E, the number of revolutions is constant and follows A'D'—E'. In the range EF the curve 22 falls along E'F', whereas it becomes constant again from F' to B'. At B the number of revolutions falls steeply to 0 (C'), in view of the fact that C means the condition in which the field of the generator and thus the voltage of the generator is 0. As it will be noted the number of revolutions does not fall until the torque has increased to a certain value (point E'), whereas a usual compounding would mean a stronger dependence of the load, also for small values of the torque. Further, a current-limiting effect is obtained, as the armature current never exceeds the value designated by C.

An alteration in the characteristic of the motor is obtained by reversing the current in the field winding 3 by means of the switch 19, and by altering the direction of the magnetization in the windings 28 and 11 by shifting over the switches 26 and 30 at the same time as the degree of selfmagnetization of the motor transductor 8, 10, 12, 29 is altered by the opening of contact 32. Hereby the self-magnetization as well as the magnetization in the control winding 11, in the transductor controlling the current in the generator field winding 3, will get the same direction as that of the magnetization produced in the control winding 9 by the armature current during generator operation of the motor 2. In the transductor controlling the current in the motor field winding 4 the self-magnetization as well as the magnetization in the control winding 10 produced by the armature current during lifting will, on the other hand, have opposite direction of the magnetization in the control winding 12. This circuit-arrangement serves for controlling the lowering speed in hoists.

In this arrangement the field current curve 21 is turned 180° in relation to Figure 2 and its course will consequently be as shown in Figure 4. The range MN in Figure 4 corresponds to CB, Figure 2, and similarly, NO to BA. Curve 20, Figure 4, takes principally the same course as curve 20, Figure 2, but the part of the curve where the transductor takes up varying voltage becomes, however, on account of the altered self-magnetization, more extended so that the part EF (Figure 2) will be changed into JK (Figure 4). In the same way, HJ corresponds to DE, and KL to FG.

The curve for the number of revolutions in dependence of the torque is for this circuit-arrangement shown in Figure 5. The number of revolutions is negative, i. e. the motor runs in the lowering direction, whereas Figure 2 designates the lifting direction when the invention is utilized in a hoist.

By this circuit-arrangement it is provided that the lowering of a large load takes place at less speed (K') than the lowering of a small load or an empty hook (J'). This is of particular importance when braking after lowering. When starting the lowering movement it is further provided that the armature current, which must in this case be negative during the acceleration, as the motor works with a negative direction of revolution, will not exceed a certain value corresponding to the point M.

Another alteration of the characteristics of the motor is obtained by reversing the direction of magnetization of the winding 12, by means of the switch 27, as compared to the circuit-arrangement which is the basis of Figure 2. The new characteristics are particularly suitable for the control of the number of revolutions at small speeds. In the transductor controlling the current in the generator field winding 3, the self-magnetization as well as the magnetization in the control winding 11 will have opposite direction of the magnetization in the control winding 9 produced by the armature current during lifting or forward driving, whereas in the other transductor, which controls the current in the motor field winding 4, the self-magnetization as well as the magnetization in the control winding 12 have the same direction as the magnetization in the control winding 10 produced by the armature current during lifting or forward driving.

The generator field current in this case is shown as curve 21 in Figure 6, and the motor field current is shown in the same figure as curve 20. Curve 21 in Figure 6 corresponds entirely to curve 21 in Figure 2, apart from the fact that the maximum current in the magnetization winding of the generator is considerably smaller, as this circuit-arrangement is used for obtaining comparatively small speeds. The course of curve 20 in Figure 6 is like that of curve 20 in Figure 2; the part corresponding to EF has, however, been moved to a negative value of the armature current (QR). By this circuit-arrangement is provided, as by those previously described, that the armature current during starting does not exceed a certain value applying to the point V. Further, it is provided that the armature current during braking commencing at a greater speed, will be limited, since such a braking current, which will be negative, will cause the field of the motor to decrease, if the armature current exceeds the value at R.

The number of revolutions to torque characteristic, which is obtained by this circuit-arrangement, appears from Figure 7, showing that the number of revolutions until a certain positive torque, corresponding to U', is constant. If the torque is greater than this value, the number of revolutions will fall and become 0 at V'. When braking, on the other hand, the number of revolutions will increase in the range R'Q'.

A circuit-arrangement which pays still more regard to the braking from a great number of revolutions to a smaller one is obtained by closing the contact 24 and reversing the magnetization current in the winding 11 relatively to the direction it has in the circuit-arrangement on which Figure 6 is based.

In the transductor controlling the current in the generator field winding 3 the self-magnetization will hereby have opposite direction of the magnetization in the control winding 11 as well as of the magnetization in the control winding 9 produced by the armature current during lifting or forward driving; whereas in the transductor controlling the current in the motor field winding 4 the self-magnetization and the magnetization in the control winding 12 have the same direction as the magnetization in the control winding 10 produced by the armature current during lifting or forward driving. The field current characteristics obtained hereby appear from Figure 8, wherein curve 20, which here takes the course $x, y, z, a$, is exactly the same as in Figure 6. The field current characteristic of the generator, curve 21, is on the other hand altered so that the field current at all positive values of the armature current and at all negative values of the armature current which are smaller than that corresponding to the point $c$, has a constant relatively small value determined by the impedance 23, as in this range the transductor may take up maximum voltage. Not until the armature current increases in negative direction beyond the value at $c$, the field current starts rising, as the voltage taken up by the transductor decreases, and attains its maximum value at the point $b$. Here, no current limiting effect is obtained, such as in the preceding cases, when starting from a smaller speed, but when braking from a higher speed, as the generator field current, when the armature current becomes only a little bigger than corresponding to the value at $b$, will magnetize the generator so that the speed increases corresponding to the part $c'b'$ in Figure 9, which shows the number of revolutions to torque characteristic $a', c', b', z', y', x'$ obtained by this circuit-arrangement. If the speed of the motor exceeds that corresponding to the value at $b'$, the armature current will further increase. When it attains a value corresponding to $z'$ the field of the motor will, however, start decreasing, which will limit the current and the torque as shown in Figures 8 and 9.

As it appears from the above, all the circuit-arrangements mentioned are obtainable without change-overs in the armature current circuit. All change-overs which have been made are change-overs of smaller currents which do not require great and costly means.

If the driving motor supplying the power to the Leonard-dynamo cannot supply more than a certain maximum effect (which e. g. is the case with a diesel-engine) the field current characteristic of the generator may advantageously be adapted to this condition. With the field current characteristic (curve 21) shown in Figure 2 the generator supplies its maximum effect at the point B, as the generator here delivers its maximum current and voltage, and the location of the point B may consequently be determined in relation to the maximum effect of the driving motor (17). As the part BC is almost parallel to the axis of ordinates the armature current will be almost constant, and the effect which is taken from the dynamo (1) will, therefore, decrease nearly proportional to the generator voltage. By moving the point C further out along the axis of abscissa without moving point B, it is obtained, however, that the current increases with decreasing voltage, so that the effect obtained from the machinery is greater, which is of importance when it is desired to obtain a great acceleration of the motor. The generator field current characteristic may be altered as described above, by reducing the degree of self-magnetization of the transductor 7, 9, 11, 23, e. g. by altering the number of turns of the winding 28.

What is claimed is:

1. A system for controlling the revolutions of an electric motor, comprising a prime mover, a direct current generator having a field and an armature and driven by the prime mover, a direct current motor having a field and an armature, means connecting the two armatures in a closed circuit, a first alternating current supply line, a first rectifier and a first inductive reactance device connected in series with the alternating current line, means including a first reversing switch connecting the output of the rectifier to the field of the generator, an impedance and a switch in series connected to by-pass the inductive reactance device, a first generator-field control winding, means including a reversing switch connecting the control winding to the output of the rectifier, a second generator-field control winding, means including a reversing switch connecting the second control winding to a direct current supply, a generator-armature current winding connected in the closed armature circuit, the said three windings being so disposed that the magnetic fields set up by the currents flowing in the windings add vectorially to vary the inductive reactance of the inductive reactance device in accordance with the resultant magnitude and direction of those magnetic fields and hence to vary the current reaching the rectifier; a second alternating current supply line, a second rectifier and a second inductive reactance device connected in series with the second alternating current line, means connecting the output of the rectifier to the field of the motor, an impedance connected to by-pass the second reactance device, a first motor-field control winding, means including an impedance and a switch in parallel therewith connecting the first motor-field control winding to the output of the rectifier, a second motor-field control winding and means including a reversing switch connecting the second motor-field control winding to a direct current supply, a motor-armature current winding connected in the closed armature circuit; the first and second motor-field control windings and the motor armature current winding being so disposed that the magnetic fields set up by the currents flowing in these windings add vectorially to vary the inductive reactance of the inductive reactance device in accordance with the resultant magnitude and direction of those magnetic fields and hence to vary the current reaching the second rectifier.

2. A system for controlling the revolutions of an electric motor, comprising a prime mover, a direct current generator having a field and an armature and driven by the prime mover, a direct current motor having a field and an armature, means connecting the two armatures in a closed circuit, a first alternating current supply line, an inductive reactance device and a rectifier in series with the alternating current line, means reversibly connecting the output of the rectifier to the field of the generator, a first electromagnetic element reversibly connected to the ouput of the rectifier, a second electromagnetic element connected in the closed armature circuit, a third electromagnetic element reversibly connected to a direct current supply, the three said electromagnetic elements being so disposed that the magnetic fields thereof act upon the inductive reactance device to vary the inductive reactance thereof as a function of the vectorial sum of the direction and magnitude of the rectifier output, the generator armature current and the direct current supply in the said three elements and thus to control the current to the generator field; a second alternating current supply line, a second inductive reactance device and a second rectifier connected in series with the second alternating current supply line, means connecting the output of the second rectifier to the field of the motor, a fourth electromagnetic element reversibly connected to a direct current supply line, a fifth electromagnetic element connected in the closed armature circuit, and a sixth electromagnetic element connected to the output of the second rectifier, the said fourth, fifth and sixth electromagnetic elements being so disposed that the magnetic fields thereof act upon the second inductive reactance device to vary the inductive reactance thereof as a function of the vectorial sum of the direction and magnitude of the second rectifier output, the motor armature current and the second direct current supply in the fourth, fifth and sixth electromagnetic elements and thus to control the current to the motor field.

3. A system as defined in claim 2 wherein an impedance and a switch in series are connected in parallel with the first inductive reactance device and an impedance is connected in parallel with the second inductive reactance device.

4. A system as defined in claim 2, wherein an impedance and a switch are connected in parallel with each other and in series with the sixth electromagnetic element.

5. A system for controlling the revolutions of an electric motor, comprising a prime mover, a direct current generator having a field and an armature and driven by the prime mover, a direct current motor having a field and an armature, means connecting the two armatures in a closed circuit, a first alternating current supply line, a first inductive reactance device and a first rectifier in series with the alternating current supply line, means reversibly connecting the output of the rectifier to the field of the generator, a direct current supply line, means to apply to the inductive reactance device magnetic fields set up by and respectively proportional to the output of the rectifier, to the direct current supply and to the generator armature current, including means to reverse the direction of the first two, the inductive reactance of the inductive reactance device being thus varied as a function of the vectorial sum of the direction and magnitude of the three magnetic fields; a second alternating current supply line, a second inductive reactance device and a second rectifier in series with the second alternating supply line, means connecting the output of the second rectifier to the field of the motor, and means to apply to the second inductive reactance device magnetic fields set up by and respectively proportional to the output of the second rectifier, to the direct current supply, and to the motor armature current, including means to reverse the direction of the magnetic field derived from the direct current supply, the inductive reactance of the second inductive reactance device being thus varied as a function of the vectorial sum of the magnitude and direction of the three magnetic fields applied thereto.

6. A system as defined in claim 5, wherein an impedance and a switch are connected in parallel with the first inductive reactance device, an impedance is connected in parallel with the second inductive reactance device, and an impedance and a switch are connected in parallel to make possible variation of the magnetic field derived from the output of the second rectifier.

7. A system for regulating the number of revolutions of motors by means of Ward-Leonard control in which the motor and generator fields are controlled in dependence on the armature current that comprises self-exciting transductors positioned in the field circuits of said motor and of said generator, a control winding associated with each of said transductors and means to feed direct current from the armatures of said motor and generator to the associated control windings for said transductors and further control windings associated with each of said transductors, each of said further control windings being responsive respectively to the field voltage of said motor and generator.

References Cited in the file of this patent

UNITED STATES PATENTS

| | | |
|---|---|---|
| 1,174,772 | Steiner | Mar. 7, 1916 |
| 2,559,538 | Jacobs | July 3, 1951 |
| 2,677,097 | Carleton | Apr. 27, 1954 |

OTHER REFERENCES

Publication: "Controllers for Electric Motors" by James and Markle, 2nd ed., McGraw-Hill Book Company, pages 217, 218 relied on.